US012786354B2

(12) United States Patent
Ahn

(10) Patent No.: US 12,786,354 B2
(45) Date of Patent: Nov. 3, 2026

(54) SENSOR DATA PROCESSING APPARATUS AND METHOD FOR AUTONOMOUS DRIVING

(71) Applicant: 42dot Inc., Seoul (KR)

(72) Inventor: Dae Sung Ahn, Yongin-si (KR)

(73) Assignee: 42dot Inc., Seoul (KR)

( * ) Notice: Subject to any disclaimer, the term of this patent is extended or adjusted under 35 U.S.C. 154(b) by 311 days.

(21) Appl. No.: 18/392,447

(22) Filed: Dec. 21, 2023

(65) Prior Publication Data

US 2024/0223732 A1 Jul. 4, 2024

(30) Foreign Application Priority Data

Dec. 28, 2022 (KR) ........................ 10-2022-0187678

(51) Int. Cl.
*H04N 7/18* (2006.01)
*B60W 60/00* (2020.01)
*H04N 7/035* (2006.01)

(52) U.S. Cl.
CPC ............ *H04N 7/181* (2013.01); *B60W 60/00* (2020.02); *H04N 7/035* (2013.01); *B60W 2420/403* (2013.01)

(58) Field of Classification Search
CPC ....... H04N 7/181; H04N 7/035; B60W 60/00; B60W 2420/403; B60W 60/001; B60W 40/02; B60W 2050/0005; G06F 9/06
See application file for complete search history.

(56) References Cited

U.S. PATENT DOCUMENTS

| | | | | |
|---|---|---|---|---|
| 9,413,957 B2 * | 8/2016 | Jayaram | ............... | H04N 5/0733 |
| 9,596,666 B1 * | 3/2017 | Sibenac | .................. | H04W 4/70 |
| 10,880,474 B1 * | 12/2020 | Thomas | ................... | H04N 5/04 |
| 11,136,048 B2 * | 10/2021 | Wang | ................ | B60W 60/0051 |

FOREIGN PATENT DOCUMENTS

| | | | | |
|---|---|---|---|---|
| CN | 113706479 A | 11/2021 | | |
| JP | 7367031 B2 * | 10/2023 | ............. | G06V 20/56 |

* cited by examiner

*Primary Examiner* — Abdhesh K Jha
*Assistant Examiner* — Alexander George Matta
(74) *Attorney, Agent, or Firm* — Kilpatrick Townsend & Stockton LLP

(57) ABSTRACT

Provided is a sensor data processing apparatus and method for autonomous driving. The sensor data processing apparatus for autonomous driving includes a receiver configured to receive a plurality of pieces of sensor data from a plurality of sensors, and a processor configured to obtain information related to the plurality of pieces of sensor data based on a generation time point of the plurality of pieces of sensor data, generate an event indicating an update of a synchronization data group and the plurality of pieces of sensor data based on the information, and transmit synchronized sensor data to a client based on the synchronization data group and the event.

17 Claims, 10 Drawing Sheets

| | Description | Remark |
|---|---|---|
| Target board | Nvidia NRU board | · NRU-110V Series |
| Image sensor | On semi AR0147 | · 1280x720 @30fps |
| Image format | · Number of cameras: 3ea<br>· Resolution: HD (1280 x 720)<br>· Format: RGB888<br>· Frame rate: 30fps (33.33ms) | · Bit rate (bps)<br>- 82,944,000 byte (83 MB) per channel<br>- Total: 83MBx3ea = Approximately 250MB |
| Camera server | 1 process | · Mode: Grand master<br>· Camera server S/W codec is used<br>- RGBA to RGB<br>· Three camera video streams are transmitted to a client |
| Camera server client example | 2 process | · Target: Grand master<br>· Renderer<br>- opencv is used<br>· In two client applications, an image for each camera is displayed on three windows. |
| IPC | Camera communicator | · In-house designed IPC<br>· Zero-copy function is implemented |
| Stop watch app | Apple iphone 13 pro | |
| Snapshot camera | Samsung galaxy note 20 | · High-speed imaging function is used |

FIG. 4

| | gscam2_loaned | Camera server | Remark |
|---|---|---|---|
| Target board | Nvidia NRU board | | · NRU-110V Series<br>· 8 core |
| IPC | · ROS2 open source DDS<br>- Shared memory is used<br>- Zero-copy function is provided | · Camera communicator<br>- In-house designed IPC<br>- Zero-copy function is implemented | |
| Image sensor | On semi AR0147<br>Number of cameras: Max 1 ea | | · 1280x720 @30fps |
| Image transfer format | Resolution: HD (1280 x 720)<br>Format: RGB888<br>Frame rate: 30fps (33.33ms) | | · one Image stream<br>- 2,764,800 (2.8MB)<br>· Bit rate (bps)<br>- 82,944,000 byte (83MB) |
| Convert codec | gstreamer s/w converter<br>· YUV(UYVY) to RGB | Camera server s/w converter<br>· RGBA to RGB | |
| Image publisher | · gscam2_loaned node<br>- Max 4 process | · Camera server node<br>- One process | · Camera server uses only 1 process since multi-video stream is processed in 1 process corresponding to multi-camera |
| Image subscriber | · image_subscriber_loaned<br>- Max 10 process | · Camera server client example<br>- Max 10 process | |

FIG. 6

| | |
|---|---|
| Minimum | 1173 us |
| Maximum | 1470 us |
| Average | 1304.73 us |
| Standard deviation | 68.73519 us |

| | ROS2 RMW iceoryx | Sensor data processing apparatus |
|---|---|---|
| Average transmission time | 1304 [us] | 577 [us] |
| Standard deviation | 69 [us] | 31 [us] |
| Maximum time required | 1470 [us] | 686 [us] |
| Minimum time required | 1173 [us] | 468 [us] |

| Number of subscribers | | | gscam2_loaned | Camera server | Remark |
|---|---|---|---|---|---|
| 10 | CPU share | Publisher | Average 44% | Average 8.4% | · 8 core |
| | | Subscriber | Average 3.2% | Average 1.26% | |
| | Memory usage | Publisher | 0.3% | 0.4% | · 32GB |
| | | Subscriber | 0.1% | 0.1% | |
| | Load average | Total | Approximately 3.74 | Approximately 1.46 | · 8 core<br>· Average standard value per minute |
| | Transfer performance | Total | 2093 [us] →3039 [us] | 624 [us] → 1095 [us] | · Value gradually increases as the number of subscribers increases |

FIG. 10

SENSOR DATA PROCESSING APPARATUS AND METHOD FOR AUTONOMOUS DRIVING

CROSS-REFERENCE TO RELATED APPLICATION

This application claims the benefit of Korean Patent Application No. 10-2022-0187678 filed on Dec. 28, 2022, in the Korean Intellectual Property Office, the entire disclosure of which is incorporated herein by reference for all purposes.

BACKGROUND

1. Field of the Invention

One or more embodiments relate to a sensor data processing apparatus and method for autonomous driving.

2. Description of the Related Art

In order to perform autonomous driving in which a vehicle must be controlled in a situation with a rapid movement of the vehicle, it is necessary to synchronize pieces of sensor data input through multiple channels.

In applications such as autonomous driving, recognition errors of the sensor data input from the multiple channels may be minimized only when the pieces of data at the same time are transmitted and received at once.

In a case of transmitting a plurality of pieces of asynchronously input sensor data to a plurality of clients through an inter-process communication (IPC), it is difficult to perform channel synchronization between clients.

When peer-to-peer (P2P) type IPC is used, a client may require a plurality of communication lines which needs multiple times of copying processes, and a computation amount may thus increase.

SUMMARY

According to an aspect, there is provided a sensor data processing apparatus for autonomous driving, the sensor data processing apparatus including a receiver configured to receive a plurality of pieces of sensor data from a plurality of sensors, and a processor configured to obtain information related to the plurality of pieces of sensor data based on a generation time point of the plurality of pieces of sensor data, generate an event indicating an update of a synchronization data group and the plurality of pieces of sensor data based on the information, and transmit synchronized sensor data to a client based on the synchronization data group and the event.

The plurality of sensors may include a plurality of cameras, and each of the plurality of pieces of sensor data may be configured with plurality of frames.

The processor may be configured to obtain frame rates corresponding to the plurality of sensors, set a frame coefficient based on the frame rates, and generate a group of synchronized frames (GOS) from a plurality of frames constituting the plurality of pieces of sensor data based on the frame coefficient and a threshold.

The processor may be configured to determine a similar time point corresponding to the GOS based on the threshold, in response to the reception of the plurality of pieces of sensor data, search for a nearest GOS corresponding to a time point nearest to the similar time point from a GOS container that stores the GOS, and index the GOS based on the nearest GOS.

The processor may be configured to, in response to the indexing, store an index of the GOS and a memory address, where the GOS is stored, in the GOS container.

The processor may be configured to, when a first generation time point of a first frame included in the plurality of frames is included within the threshold, cause the first frame to be included in the GOS, and when the first generation time point is beyond the threshold, cause the first frame to be included in a GOS corresponding to a previous time point or a GOS corresponding to a next time point.

The processor may be configured to, in response to the generation of the GOS, generate the event, and transmit the event to the client.

The event may include frame header information and a frame pointer corresponding to the GOS.

The processor may be configured to, in response to the reception of the plurality of pieces of sensor data, generate and store a group of frame (GOF) consisting of a set of some or all of the plurality of pieces of sensor data.

According to another aspect, there is provided a sensor data processing method for autonomous driving, the sensor data processing method including receiving a plurality of pieces of sensor data from a plurality of sensors, obtaining information related to the plurality of pieces of sensor data based on a generation time point of the plurality of pieces of sensor data, generating an event indicating an update of a synchronization data group and the plurality of pieces of sensor data based on the information, and transmitting synchronized sensor data to a client based on the synchronization data group and the event.

The plurality of sensors may include a plurality of cameras, and each of the plurality of pieces of sensor data may be configured with plurality of frames.

The generating of the event may include obtaining frame rates corresponding to the plurality of sensors, setting a frame coefficient based on the frame rates, and generating a GOS from a plurality of frames constituting the plurality of pieces of sensor data based on the frame coefficient and a threshold.

The generating of the GOS may include determining a similar time point corresponding to the GOS based on the threshold, in response to the receiving of the plurality of pieces of sensor data, searching for a nearest GOS corresponding to a time point nearest to the similar time point from a GOS container that stores the GOS, and indexing the GOS based on the nearest GOS.

The indexing of the GOS may include, in response to the indexing, storing an index of the GOS and a memory address, where the GOS is stored, in the GOS container.

The generating of the GOS may include, when a first generation time point of a first frame included in the plurality of frames is included within the threshold, causing the first frame to be included in the GOS, and when the first generation time point is beyond the threshold, causing the first frame to be included in a GOS corresponding to a previous time point or a GOS corresponding to a next time point.

The generating of the event may include, in response to the generating of the GOS, generating the event, and transmitting the event to the client.

The event may include frame header information and a frame pointer corresponding to the GOS.

The generating of the event may include, in response to the receiving of the plurality of pieces of sensor data, generating and storing a GOF consisting of a set of some or all of the plurality of pieces of sensor data.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 4 illustrates an example of hardware specifications for a comparative experiment;

FIGS. 6 to 9 are diagrams illustrating transmission performance indicators;

FIG. 10 illustrates performance comparison results when a plurality of clients is used.

DETAILED DESCRIPTION

Figure 1:
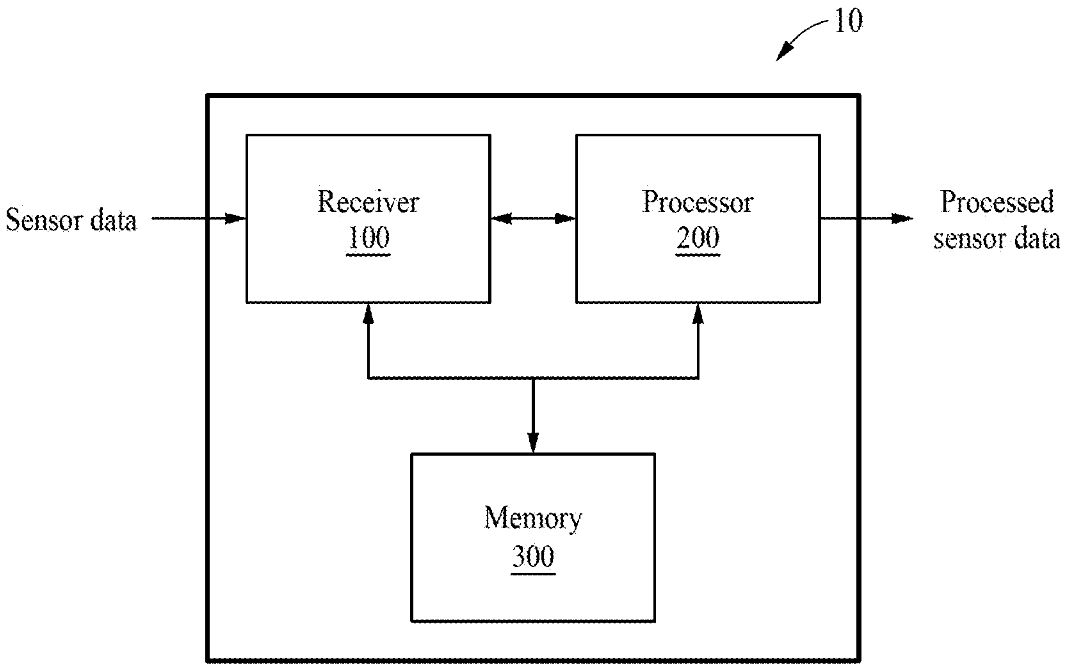
FIG. 1 is a schematic block diagram illustrating a sensor data processing apparatus according to an embodiment.

The following structural or functional descriptions of embodiments described herein are merely intended for the purpose of describing the embodiments described herein and may be implemented in various forms. Here, the embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

As used in connection with the present disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

The term "unit" used herein may refer to a software or hardware component, such as a field-programmable gate array (FPGA) or an ASIC, and the "unit" performs predefined functions. However, "unit" is not limited to software or hardware. The "unit" may be configured to reside on an addressable storage medium or configured to operate one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more central processing units (CPUs) within a device or a security multimedia card. In addition, "unit" may include one or more processors.

Hereinafter, the embodiments will be described in detail with reference to the accompanying drawings. When describing the embodiments with reference to the accompanying drawings, like reference numerals refer to like elements and a repeated description related thereto will be omitted.

FIG. 1 is a schematic block diagram illustrating a sensor data processing apparatus according to an embodiment.

Referring to FIG. 1, a sensor data processing apparatus 10 may process sensor data. The sensor data may refer to data detected by a sensor. The sensor may include a light detection and ranging (LiDAR) sensor, a radio detection and ranging (RADAR) sensor, a camera, and/or an ultrasonic sensor. The camera may include a stereo camera.

The sensor data processing apparatus 10 may be implemented inside or outside a vehicle. The vehicle may refer to a vehicle designed to be used to deliver a person or goods. The vehicle may include, for example, a car, train, ship, boat, airplane, and/or bicycle.

The sensor data processing apparatus 10 may process sensor data for autonomous driving. The autonomous driving may refer to an operation in which the vehicle drives by itself by recognizing a driving environment, determining dangerous elements, and deriving an optimal path, while a driver does not operate the vehicle partially or entirely.

The sensor data processing apparatus 10 includes a receiver 100 and a processor 200. The sensor data processing apparatus 10 may further include a memory 300.

The receiver 100 may include a receiving interface. The receiver 100 may receive data from a sensor or the memory 300. The receiver 100 may receive a detection result from the sensor.

The receiver 100 may receive a plurality of pieces of sensor data from a plurality of sensors. The receiver 100 may output the received plurality of pieces of sensor data to the processor 200.

The processor 200 may process data stored in the memory 300. The processor 200 may execute a computer-readable code (e.g., software) stored in the memory 300 and instructions triggered by the processor 200.

The processor 200 may be a data processing device embodied by hardware having a circuit of a physical structure to execute desired operations. The desired operations may include, for example, codes or instructions included in a program.

The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

The processor 200 may obtain information related to a plurality of pieces of sensor data based on a generation time point of the plurality of pieces of sensor data. The plurality of sensors may include a plurality of cameras. Each of the plurality of pieces of sensor data may include a plurality of frames.

The processor 200 may generate an event indicating an update of a synchronization data group and the plurality of pieces of sensor data based on information. The synchronization data group may include a group of synchronized frames (GOS) and a group of frames (GOF). The event may include frame header information and a frame pointer corresponding to the GOS.

The processor 200 may generate and store a GOF consisting of a set of some or all of the plurality of pieces of sensor data in response to the reception of the plurality of pieces of sensor data. The processor 200 may store the GOF in the memory 300.

The processor 200 may obtain frame rates corresponding to the plurality of sensors. The processor 200 may set a frame coefficient based on the frame rate. The processor 200 may generate a GOS from a plurality of frames constituting the plurality of pieces of sensor data based on the frame coefficient and a threshold.

The processor 200 may determine a similar time point corresponding to the GOS based on the threshold. In response to the reception of the plurality of pieces of sensor data, the processor 200 may search for a nearest GOS corresponding to a time point nearest to the similar time point from a GOS container that stores the GOS. The processor 200 may index the GOS based on the nearest GOS.

The processor 200 may store an index of the GOS and a memory address, where the GOS is stored, in the GOS container in response to the indexing. The GOS container may be implemented on the memory 300.

When a first generation time point of a first frame included in the plurality of frames is included within a threshold, the processor 200 may include the first frame in the GOS. When the first generation time point is beyond the threshold, the processor 200 may include the first frame in a GOS corresponding to a previous time point or a GOS corresponding to a next time point.

The processor 200 may generate an event in response to the generation of the GOS. The processor 200 may transmit the event to a client. The client may include an application.

The processor 200 may transmit synchronized sensor data to the client based on the synchronization data group and the event.

The memory 300 may store data for an operation or an operation result. The memory 300 may store instructions (or programs) executable by the processor. For example, the instructions may include instructions for executing an operation of the processor and/or instructions for executing an operation of each component of the processor.

The memory 300 may be implemented as a volatile memory device or a non-volatile memory device.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device, or an insulator resistance change memory.

Figure 2:
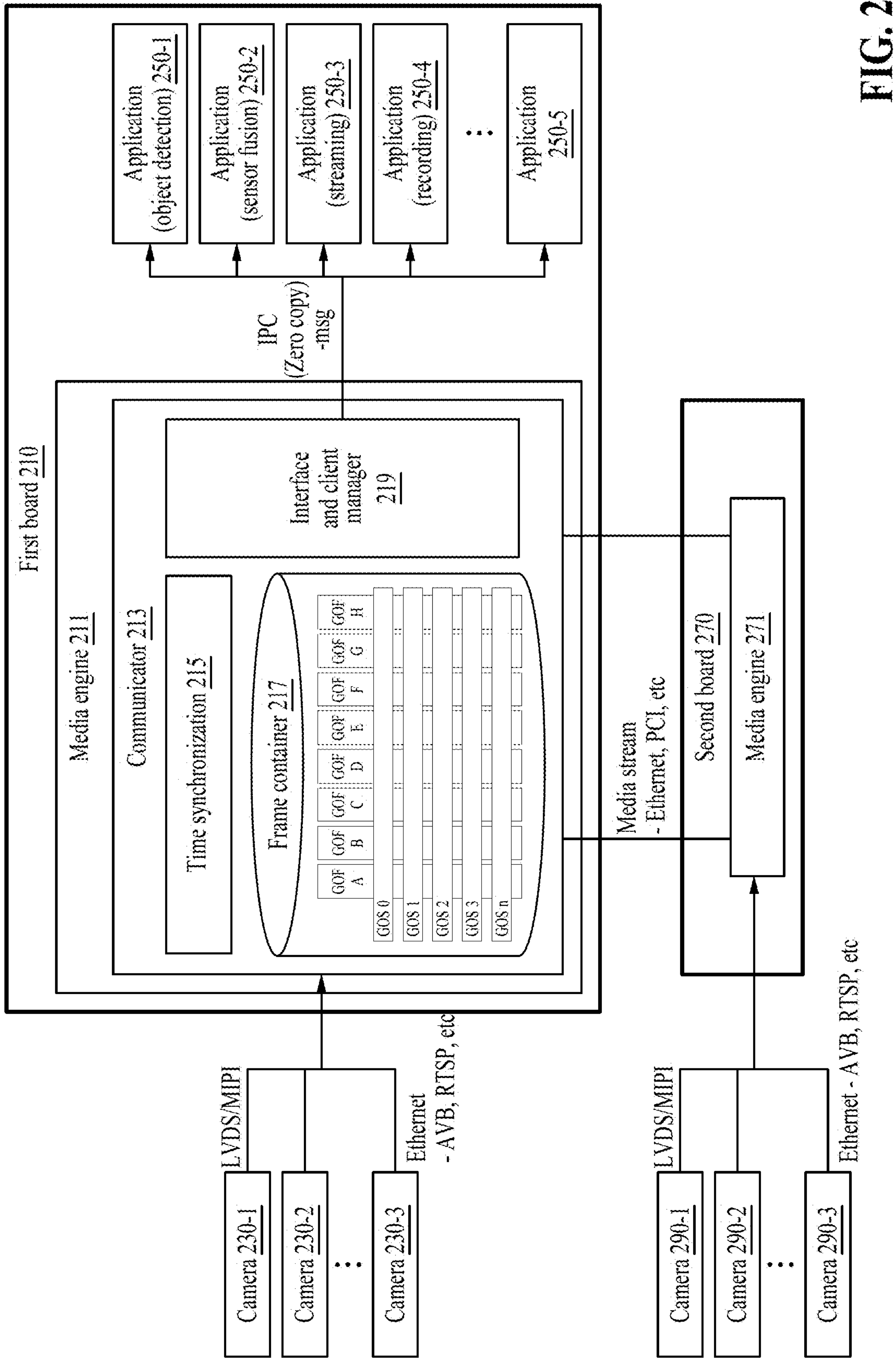
FIG. 2 illustrates an example of implementation of the sensor data processing apparatus shown in FIG. 1.

FIG. 2 illustrates an example of implementation of the sensor data processing apparatus shown in FIG. 1.

Referring to FIG. 2, a sensor data processing apparatus (e.g., the sensor data processing apparatus 10 of FIG. 1) may be implemented on a board. The board may include a circuit board. An example of FIG. 2 shows a sensor data processing process using a plurality of boards (e.g., a first board 210 and a second board 270).

The sensor data processing apparatus 10 may store pieces of sensor data received in advance or pieces of sensor data received at a previous time point, and obtain the stored data.

The sensor data processing apparatus 10 may perform synchronization and store synchronization performance. The sensor data processing apparatus 10 may store the pieces of sensor data received at the previous time and the synchronization performance. The sensor data processing apparatus 10 may process the pieces of stored information at once.

When hysteresis (e.g., previous image information or previous localization information) with the pieces of sensor data received at the previous time point is required, or in a case of an algorithm for performing complicated processing using a plurality of pieces of data, such as a sensor fusion algorithm, the sensor data processing apparatus 10 may process the pieces of sensor data in one cycle.

The sensor data processing apparatus 10 may synchronize data between boards in a board-to-board manner by a communication policy between servers. The sensor data processing apparatus 10 may use a device existing on another external board as a virtual device as if the board was mounted inside.

The sensor data processing apparatus 10 may store data by synchronizing pieces of data stored in different boards. The sensor data processing apparatus 10 may be implemented on the first board 210 and/or the second board 270.

A media engine 211 may include a communicator 213. The communicator 213 may include a time synchronization module 215, a frame container 217, and an interface and client manager 219. The time synchronization module 215 and the interface and client manager 219 may be included in a processor (e.g., the processor 200 of FIG. 1), and the frame container 217 may be included in a memory (e.g., the memory 300 of FIG. 1).

The media engine 211 may manage received video frames in channel order and/or time order using a time synchronization algorithm and a stream management technology. The media engine 211 may manage video frames as the GOF. The media engine 211 may manage the frames at the same time by managing the video frames in the unit of GOS for each channel.

The media engine 211 may transmit an update event to each client registered when the GOS is generated, thereby transmitting GOS updates. The client may transmit the synchronized sensor data to a plurality of applications 250-1, 250-2, 250-3, 250-4, and 250-5 without performing separate data copying.

The media engine 211 may transmit an event in the form of an event message. The event message may include a main header, frame header information, and/or a frame pointer.

The communicator 213 may receive sensor data from a plurality of sensors. The communicator 213 may receive images or videos from a plurality of cameras 230-1, 230-2, and 230-3.

The images or videos may be transmitted asynchronously through various communication channels. The images or videos may be transmitted through low-voltage differential signaling (LVDS), a mobile industry processor interface (MIPI), or Ethernet. Alternatively, the images or videos may be transmitted through audio video bridging (AVB) or real time streaming protocol (RTSP) using Ethernet.

The time synchronization module 215 may perform synchronization between a plurality of pieces of center data. The time synchronization module 215 may perform synchronization between frames based on a set frame rate and a timestamp when a received frame was generated.

The time synchronization module 215 may confirm a deviation between frames. The time synchronization module 215 may determine whether the frames are frames generated within a specific threshold using a coefficient value (or a tuning parameter) set based on the frame rate. The time synchronization module 215 may calculate the threshold by Equation 1.

$$\text{threshold} = fps \times \text{coefficient} \quad \text{[Equation 1]}$$

Here, fps is a frame rate, which may refer to the number of frames per second.

When a timestamp of a frame received initially from the plurality of frames is within the threshold, the time synchronization module 215 may determine that the corresponding frame is a frame generated at a similar time point. For the frame determined to be generated at the similar time point, the time synchronization module 215 may update information in the same GOS frame.

When it is determined that the timestamp exceeds the threshold or is before the threshold, the time synchronization module 215 may determine that the corresponding frame is not a frame at the same time and update information in a previous GOS or a next GOS frame.

The second board 270 may include a media engine 271. The second board 270 may receive a video from a plurality of cameras 290-1, 290-2, and 290-3. An operation of the media engine 271 may be the same as that of the media engine 211.

The first board 210 and the second board 270 may exchange media streams. The first board 210 and the second board 270 may exchange media streams through Ethernet or Peripheral Component Interconnect (PCI).

Figure 3:
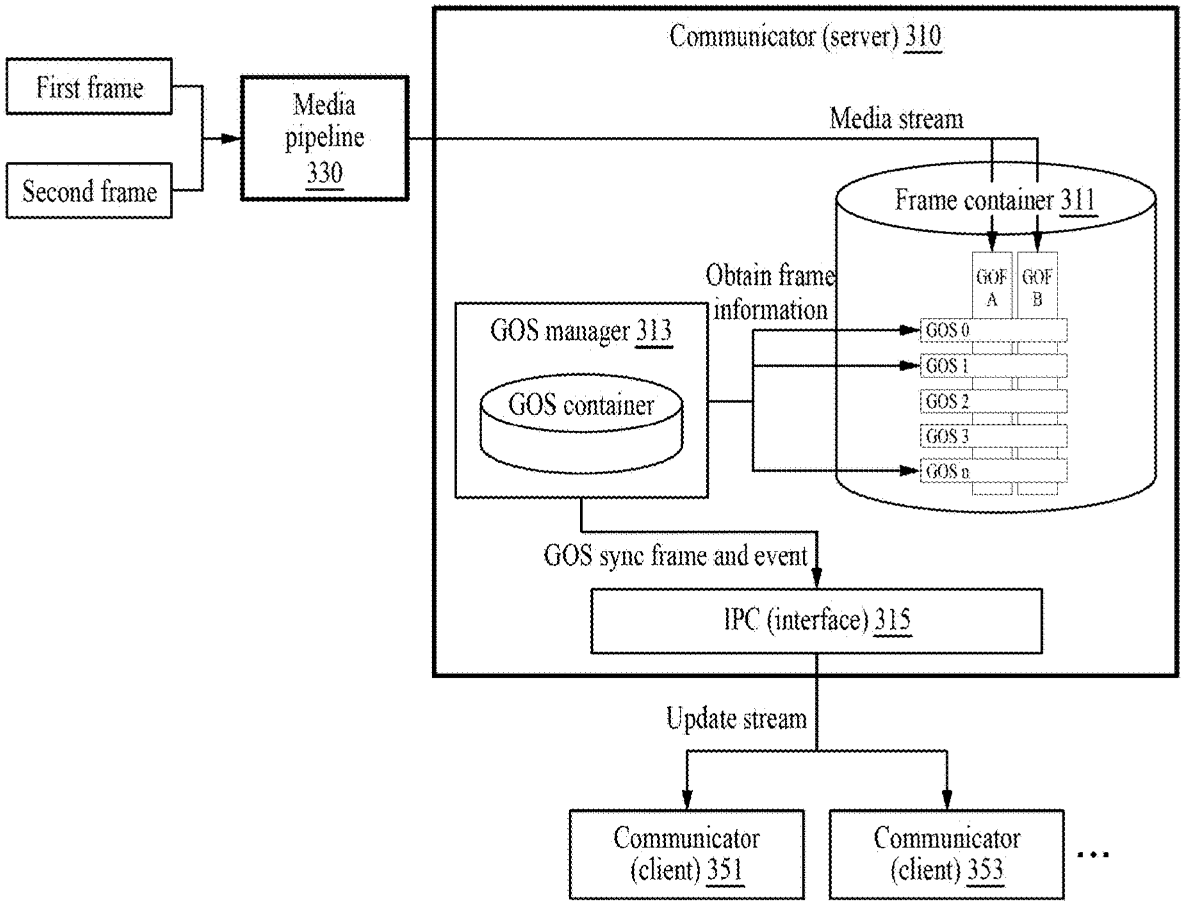
FIG. 3 is a diagram specifically illustrating a structure of the sensor data processing apparatus shown in FIG. 2.

FIG. 3 is a diagram specifically illustrating a structure of the sensor data processing apparatus shown in FIG. 2.

Referring to FIG. 3, a sensor data processing apparatus (e.g., the sensor data processing apparatus 10 of FIG. 1) may be implemented on a communicator 310. The communicator 310 may be implemented on a server.

A frame container 311 may receive a plurality of frames (e.g., a first frame and a second frame) through a media pipeline 330. The frame container 311 may store frames for each GOF each time when an asynchronously input frame is updated.

The frame container 311 may store a frame size and a GOF frame (e.g., a GOF array). The GOF frame may include an identification (ID), a size of the GOF, a threshold (e.g., a time threshold or a coefficient value), and/or a frame array. The frame array may include a frame header and a sample (e.g., raw data).

The frame container 311 may store latest data in a GOF container (e.g., a circular buffer) each time the sensor data is input from a source (e.g., a plurality of sensors).

When source frames requiring synchronization are stored, a GOS manager 313 may generate one GOS synchronization frame and store the GOS synchronization frame in a GOS container. The GOS container (e.g., a circular buffer) is a type of frame container that may generate a GOS using a frame rate and a timestamp at a generation time point of a frame each time the frame is stored.

The GOS manager 313 may perform indexing by searching the inside of the GOS container each time a source frame is input and searching for a GOS that is most similar to the generation time point of a current frame.

The GOS manager 313 may collect frames at the similar time point and store a frame index and a memory address in the GOS container.

The GOS container may include a GOS index, a GOS sync size, and a GOS frame (e.g., a GOS frame array). The GOS frame may include an ID, synchronization information, the number of frames, a generated timestamp, and a frame pointer. The frame pointer may represent a memory address.

When all source frames are synchronized and the GOS frame is generated, the GOS manager 313 may transmit an update event to all clients.

When one GOS synchronization frame is generated, the GOS manager 313 may generate an event through an inter-process communication (IPC) interface 315 and transmit the generated event to an update media streaming interface in order to notify the generation of the synchronized frames.

The GOS manager 313 may transmit information and data for the synchronized frames to the client through the update media stream interface. The information on the synchronized frames may include a GOS main header, a header for each frame, and/or a sample (e.g., raw data). The media stream interface may include an IPC interface.

The GOS manager 313 may transmit the GOS sync frames and events to other communicators (e.g., a communicator 351 and a communicator 353) through the IPC interface 315. The communicator 351 and the communicator 353 may be implemented on a client.

Figure 5:
FIG. 5 illustrates examples of processing results of the sensor data processing apparatus shown in FIG. 1.

FIG. 4 illustrates an example of hardware specifications for a comparative experiment and FIG. 5 illustrates examples of processing results of the sensor data processing apparatus shown in FIG. 1.

Referring to FIGS. 4 and 5, a sensor data processing apparatus (e.g., the sensor data processing apparatus 10 of FIG. 1) may perform synchronization between a plurality of pieces of asynchronously input sensor data.

The sensor data processing apparatus 10 may synchronize a plurality of frames input from a plurality of cameras using a GOS frame containing algorithm and a frame management function of a camera server.

Figure 7:
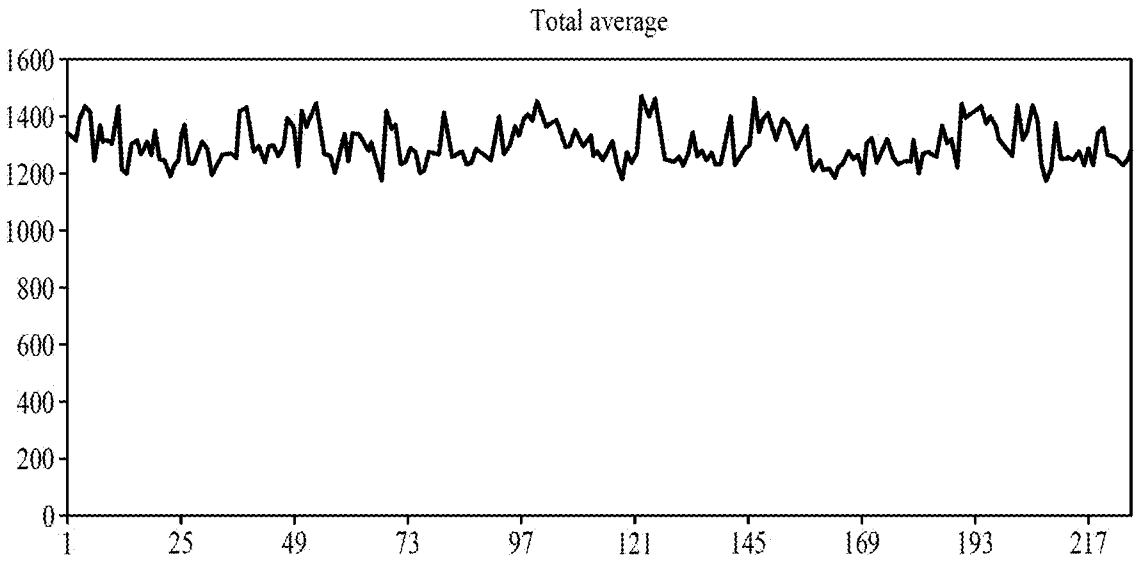

Examples of FIGS. 6 and 7 may show results of sensor data processing using hardware of the specifications shown in FIG. 4. The example of FIG. 5 may show images captured by high speed imaging using a smartphone camera. The sensor data processing apparatus 10 may simultaneously transmit video streams without frame synchronization problems to a plurality of clients.

The sensor data processing apparatus 10 may maximize performance of a vision algorithm and minimize errors by solving problems regarding data collection for machine learning and synchronization required for vision algorithm processing by using a camera server of practical implementation using a communicator.

FIGS. 6 to 9 are diagrams illustrating transmission performance indicators.

Figures 8, 9:
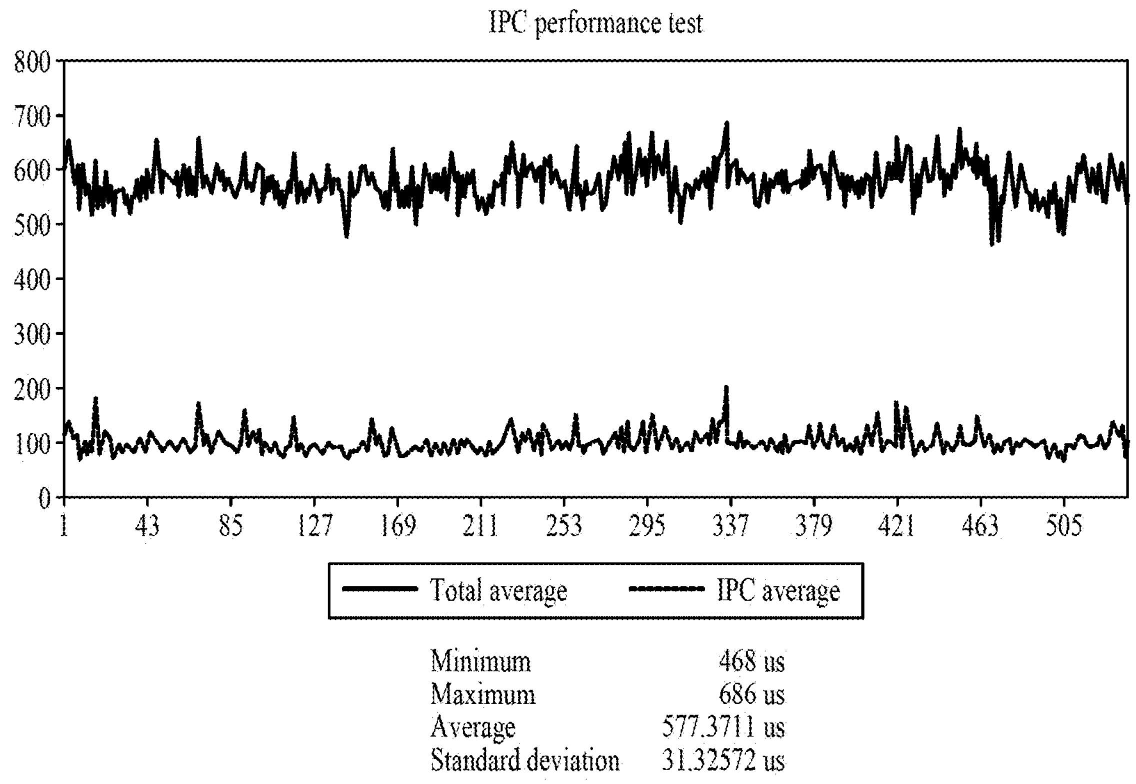

Referring to FIGS. 6 to 9, measurement data operated at runtime may be extracted while changing the number of clients that use the video stream. FIG. 8 may show experimental conditions for performance comparison. Examples of FIGS. 9 and 10 may show synchronization performance at runtime.

As shown in the example of FIG. 9, a sensor data processing apparatus (e.g., the sensor data processing apparatus 10 of FIG. 1) may exhibit performance (transmission time reduced by more than two times) that is improved by more than two times than that of the related art.

FIG. 10 illustrates performance comparison results when a plurality of clients is used.

Referring to FIG. 10, measurement data operated at runtime may be extracted while changing the number of clients that use the video stream. The results of FIG. 10 may be measured using the hardware specifications of FIG. 6.

Figure 11:
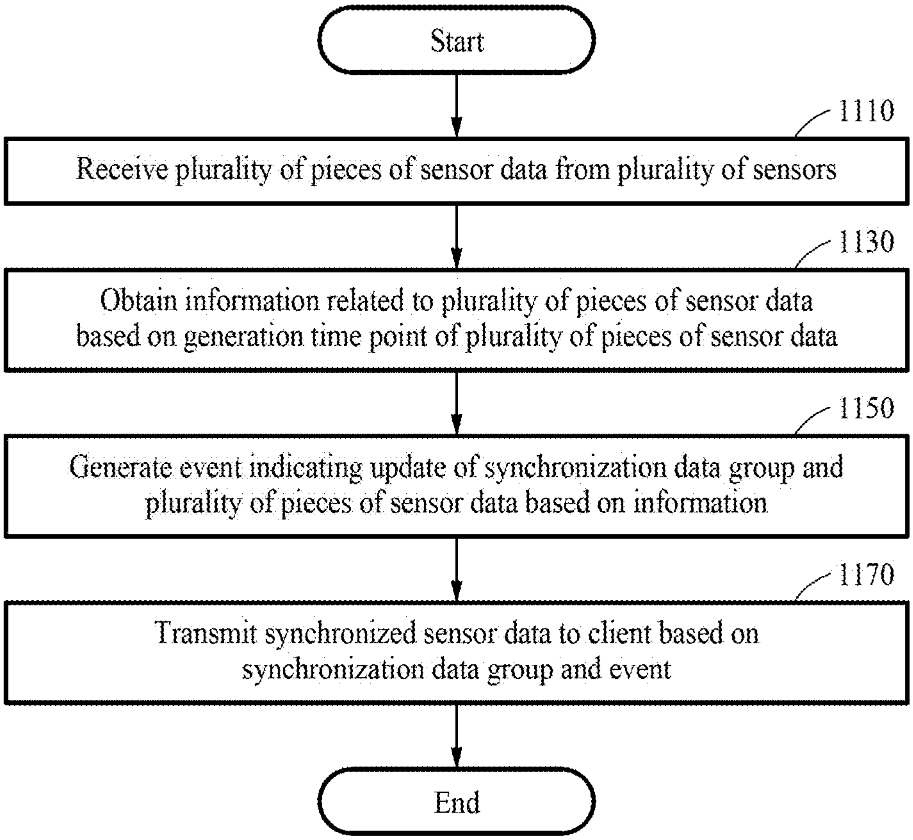
FIG. 11 illustrates a flowchart of an operation of the sensor data processing apparatus shown in FIG. 1.

FIG. 11 illustrates a flowchart of an operation of the sensor data processing apparatus shown in FIG. 1.

Referring to FIG. 11, in operation 1110, a receiver (e.g., the receiver 100 of FIG. 1) may receive a plurality of pieces of sensor data from a plurality of sensors.

In operation 1130, a processor (e.g., the processor 200 of FIG. 1) may obtain information related to the plurality of pieces of sensor data based on a generation time point of the plurality of pieces of sensor data. The plurality of sensors may include a plurality of cameras. Each of the plurality of pieces of sensor data may include a plurality of frames.

In operation 1150, the processor 200 may generate an event indicating an update of a synchronization data group and the plurality of pieces of sensor data based on information. The synchronization data group may include a GOS and a GOF. The event may include frame header information and a frame pointer corresponding to the GOS.

The processor 200 may generate and store a GOF consisting of a set of some or all of the plurality of pieces of sensor data in response to the reception of the plurality of pieces of sensor data.

The processor 200 may obtain frame rates corresponding to the plurality of sensors. The processor 200 may set a frame coefficient based on the frame rate. The processor 200 may generate a GOS from a plurality of frames constituting the plurality of pieces of sensor data based on the frame coefficient and a threshold.

The processor 200 may determine a similar time point corresponding to the GOS based on the threshold. In response to the reception of the plurality of pieces of sensor data, the processor 200 may search for a nearest GOS corresponding to a time point nearest to the similar time point from a GOS container that stores the GOS. The processor 200 may index the GOS based on the nearest GOS.

The processor 200 may store an index of the GOS and a memory address, where the GOS is stored, in the GOS container in response to the indexing.

When a first generation time point of a first frame included in the plurality of frames is included within the threshold, the processor 200 may include the first frame in the GOS. When the first generation time point is beyond the threshold, the processor 200 may include the first frame in a GOS corresponding to a previous time point or a GOS corresponding to a next time point.

The processor 200 may generate an event in response to the generation of the GOS. The processor 200 may transmit the event to the client. The client may include an application.

In operation 1170, the processor 200 may transmit synchronized sensor data to the client based on the synchronization data group and the event.

The embodiments described herein may be implemented using a hardware component, a software component and/or a combination thereof. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and/or multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software may also be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described hardware devices may be configured to act as one or more software modules in order to perform the operations of the above-described embodiments, or vice versa.

As described above, although the embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, other implementations, other embodiments, and equivalents to the claims are also within the scope of the following claims.

What is claimed is:

1. A sensor data processing apparatus for autonomous driving, the sensor data processing apparatus comprising:

a receiver configured to receive a plurality of pieces of sensor data from a plurality of sensors; and a processor configured to:

obtain a frame rate corresponding to each of the plurality of sensors;

set a frame coefficient based on the frame rate;

determine a threshold based on the frame rate and the frame coefficient;

generate a group of synchronized frames (GOS) including at least some of a plurality of frames included in the plurality of pieces of sensor data, based on a generation time point of the plurality of pieces of sensor data and the threshold; and transmit synchronized frames included in the GOS to a client such that the synchronized frames included in the GOS are used for autonomous driving of a vehicle.

2. The sensor data processing apparatus of claim 1, wherein the plurality of sensors comprises a plurality of cameras; and wherein each of the plurality of pieces of sensor data is configured with plurality of frames.

3. The sensor data processing apparatus of claim 1, wherein the processor is configured to:

determine a time point corresponding to the GOS based on the threshold;

in response to the reception of the plurality of pieces of sensor data, search for a nearest GOS corresponding to a time point nearest to the time point corresponding to the GOS from a GOS container that stores the GOS; and index the GOS based on the nearest GOS.

4. The sensor data processing apparatus of claim 3, wherein the processor is configured to:

in response to the indexing, store an index of the GOS and a memory address, where the GOS is stored, in the GOS container.

5. The sensor data processing apparatus of claim 1, wherein the processor is configured to:

when a first generation time point of a first frame included in the plurality of frames is included within the threshold, cause the first frame to be included in the GOS; and when the first generation time point is beyond the threshold, cause the first frame to be included in a GOS corresponding to a previous time point or a GOS corresponding to a next time point.

6. The sensor data processing apparatus of claim 1, wherein the processor is configured to:

in response to the generation of the GOS, generate an event; and transmit the event to the client.

7. The sensor data processing apparatus of claim 6, wherein the event comprises frame header information and a frame pointer corresponding to the GOS.

8. The sensor data processing apparatus of claim 1, wherein the processor is configured to:

in response to the reception of the plurality of pieces of sensor data, generate and store a group of frame (GOF) consisting of a set of some or all of the plurality of pieces of sensor data.

9. A sensor data processing method for autonomous driving, the sensor data processing method comprising:

receiving a plurality of pieces of sensor data from a plurality of sensors;

obtaining a frame rate corresponding to each of the plurality of sensors;

setting a frame coefficient based on the frame rate;

determining a threshold based on the frame rate and the frame coefficient;

generating a group of synchronized frames (GOS) including at least some of a plurality of frames included in the plurality of pieces of sensor data, based on a generation time point of the plurality of pieces of sensor data and the threshold; and transmitting synchronized frames included in the GOS to a client such that the synchronized frames included in the GOS are used for autonomous driving of a vehicle.

10. The sensor data processing method of claim 9, wherein the plurality of sensors comprises a plurality of cameras; and wherein each of the plurality of pieces of sensor data is configured with plurality of frames.

11. The sensor data processing method of claim 9, wherein the method further comprises:

determining a time point corresponding to the GOS based on the threshold;

in response to the receiving of the plurality of pieces of sensor data, searching for a nearest GOS corresponding to a time point nearest to the time point corresponding to the GOS from a GOS container that stores the GOS; and indexing the GOS based on the nearest GOS.

12. The sensor data processing method of claim 11, wherein the indexing of the GOS comprises:

in response to the indexing, storing an index of the GOS and a memory address, where the GOS is stored, in the GOS container.

13. The sensor data processing method of claim 9, wherein the generating of the GOS comprises:

when a first generation time point of a first frame included in the plurality of frames is included within the threshold, causing the first frame to be included in the GOS; and when the first generation time point is beyond the threshold, causing the first frame to be included in a GOS corresponding to a previous time point or a GOS corresponding to a next time point.

14. The sensor data processing method of claim 9, wherein the method further comprises:

in response to the generating of the GOS, generating an event; and transmitting the event to the client.

15. The sensor data processing method of claim 14, wherein the event comprises frame header information and a frame pointer corresponding to the GOS.

16. The sensor data processing method of claim 9, wherein the generating of the event comprises:

in response to the receiving of the plurality of pieces of sensor data, generating and storing a group of frame (GOF) consisting of a set of some or all of the plurality of pieces of sensor data.

17. A non-transitory computer-readable storage medium storing instructions that, when executed by a processor, cause the processor to perform the method of claim 9.

* * * * *